April 24, 1934.    J. W. PUTERBAUGH    1,955,975
FRUIT JUICE EXTRACTOR
Original Filed Aug. 2, 1928
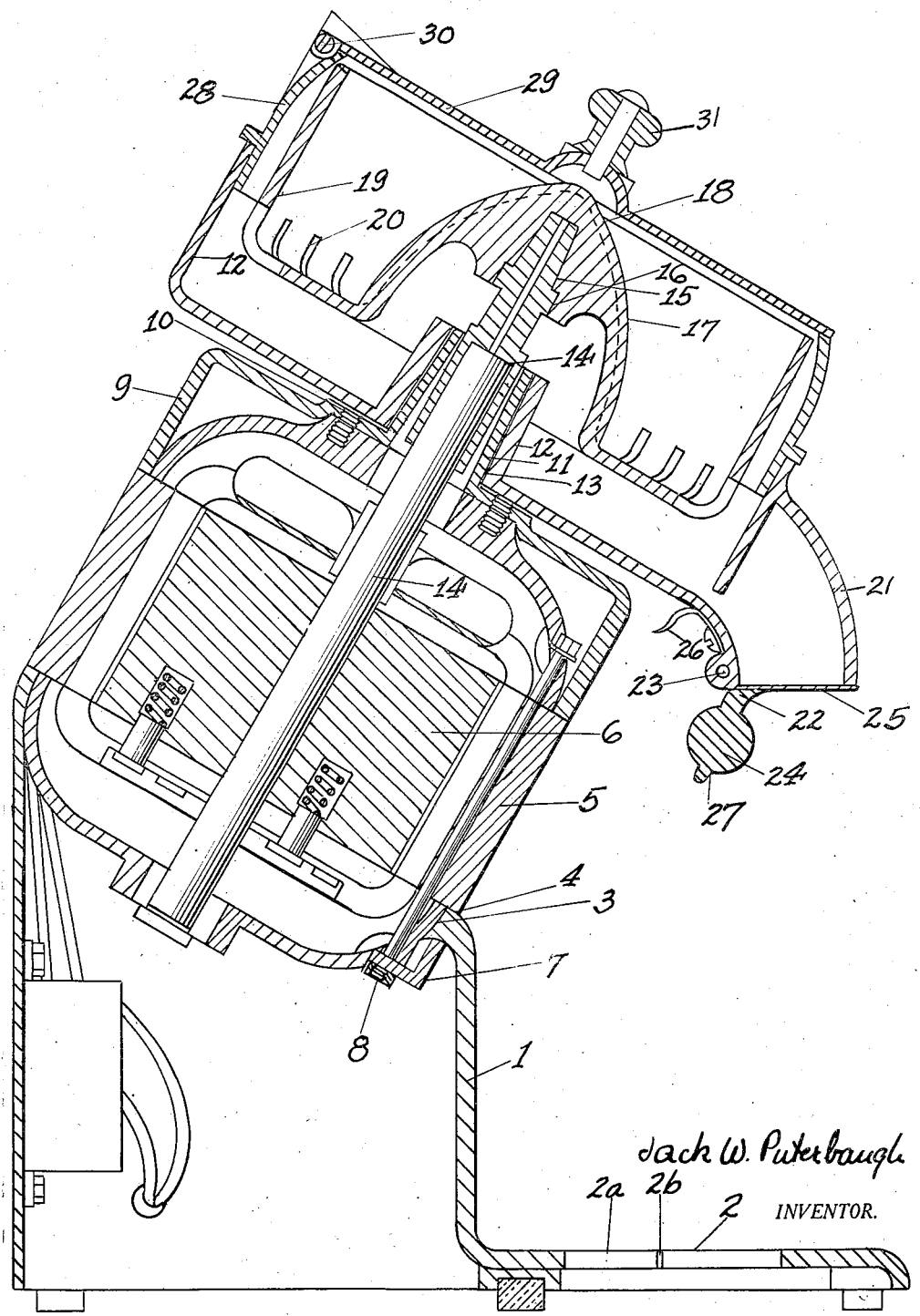
Jack W. Puterbaugh
INVENTOR.
by Allen & Allen ATTORNEY.

Patented Apr. 24, 1934

1,955,975

UNITED STATES PATENT OFFICE 1,955,975

FRUIT JUICE EXTRACTOR

Jack W. Puterbaugh, Cincinnati, Ohio, assignor to The Cincinnati Time Recorder Company, a corporation of Ohio Application August 2, 1928, Serial No. 296,956
Renewed November 25, 1932

3 Claims. (Cl. 146—3)

My invention relates to machines for extracting the juices from fruits such as limes, lemons, oranges, grape fruit, and the like.

In my Patent No. 1,550,844, I have disclosed an extractor in which a bulb and strainer are mounted on a motor shaft, and the juice from fruits is centrifugally discharged into an enclosing casing. It is the object of my invention to provide improvements particularly in this type of machine.

It is an object of my invention to provide a centrifugal extractor in which the bulb and strainer are mounted in inclined position to facilitate ease of operation. A further object is the provision of an extension base cast integrally with the machine frame supporting the motor.

Another object is the provision of a counterbalanced self-closing valve which effectively seals the machine against dust and insect contamination. A still further object is the provision of a machine in which the housing of the operating motor is used as part of the machine frame, thereby reducing the manufacturing cost.

In my novel combination I further provide for a simple and effective oiling system which is so arranged that contamination with the extracted juices is substantially impossible.

The above and other objects to which references will be made in the ensuing description I accomplish by that certain combination and arrangement of parts of which I have shown a preferred embodiment.

Referring to the drawing:—

The figure represents a vertical sectional view of the complete assembly.

The machine frame generally indicated at 1 has an enlarged base 2 which provides suitable support to prevent any likelihood of the machine tipping over. The frame has a circular opening 3 against the walls of which a peripheral flange 4 of the casing 5 of the motor 6 is seated. The base serves as a tray and is slotted at 2a and 2b to take care of drip from the spout.

In order to secure the motor firmly in position on the base I have provided clamping lugs 7 through which the motor casing bolts 8 may be extended, thereby drawing the flange 4 firmly down against the wall of the casing.

A cap 9 is securely fastened to the motor casing as with screws 10. The cap has a conical extension 11 on which the stationary extractor casing 12 fits with a friction fit as indicated at 13.

The motor shaft 14 has a tapered end 15 with a squared portion which receives a squared portion 16 of the strainer bulb 17. The strainer bulb has a conoidal fluted outer surface which is somewhat pointed at the end, as indicated at 18, so that whether the fruit is of large size, such as a grape fruit, or of small size, such as a lime, the bulb will effectively ream and shred the fruit.

Formed integrally with the bulb is the strainer body 19 having straining slits 20 through which the juice is centrifugally projected. The juice, as it is extracted from the fruit, flows down a spout 21 which is provided with a flapper valve 22. The flapper valve is pivotally mounted at 23 and a weight 24 secured thereto causes the disc 25 of the valve to be held against its seat. A spring 26 is secured to the casing in such manner that when the flapper valve is opened wide a lug 27 on the weight will engage the spring 26. Thus, when the valve is opened wide, it will remain open until some force is applied to close it.

Frictionally engaging the casing 12 is a circular casing 28 which has a cover 29 pivotally mounted thereon as indicated at 30. The cover in the vicinity thereof near the pivot is shaped so that when the cover has been lifted to slightly more than the vertical position it will bear against the outer surface of the casing 28 thereby blocking further movement of the cover and holding it in open position. A handle 31 is provided for the lid.

The operation of the machine will be apparent. The cover is lifted open and the motor turned on. The halved fruit is then held against the bulb and the contents centrifugally projected through the straining apertures. The juice flows down the spout and is caught in a suitable receptacle disposed under the valve.

The entire combination is inexpensive to make and operate. It is neat in appearance, it may be cleaned very readily, and the angle at which the bulk is mounted is such that the fruit can be held firmly against the bulb without excessive strain. While the strain of holding one halved fruit against the bulb is of no consequence, when a person operates the machine steadily the fact that less wrist strain is required than on extractors in which the shaft of the motor is vertical, is a matter of considerable importance.

Having thus described my invention, what I claim as new and desire to secure by Letters Patent, is:—

1. A fruit juice extracting device with an integral bulb and strainer, comprising a supporting base with an upwardly extending portion terminating in a circular annulus which is inclined at an angle, a motor having a shaft, and having extending flanges supported in said circular annulus, means to secure said motor to said annulus, a cap with a frustro-conical extension covering said motor end, a stationary extractor casing secured to said frustro-conical extension having a sleeve frictionally engaging said extension, and means for demountably supporting said integral bulb and strainer on the end of said motor shaft.

2. In a fruit juice extractor, an extractor casing, a centrifugal extractor bulb and strainer rotatable to extract juice from fruit and centrifugally strain the same into said casing, an opening in the top of the casing for insertion of the fruit for operation thereon by the bulb, the plane of said opening being at a slant forwardly and downwardly to the vertical whereby fruit can be conveniently inserted from the front of the machine, a discharge spout extending from a point in the casing below the low point of said slanting opening, and cover means for the spout and said top casing opening, said cover means for said top casing opening being a hinged lid secured to the high point of the inclined opening and opening rearwardly and upwardly, and the cover means for the spout being arranged for automatic opening, whereby the operator to use the extractor needs to open one of the covers only, and the machine during its idle periods can be fully protected against contamination from without, and chance leaking of juice due to the centrifugal action will be prevented by the upstanding open lid from contact with a customer at the rear of the machine who faces an operator using the machine on a store counter.

3. In a fruit juice extractor, an extractor casing, a centrifugal extractor bulb and strainer rotatable to extract juice from fruit and centrifugally strain the same into said casing, an opening in the top of the casing for insertion of the fruit for operation thereon by the bulb, the plane of said opening being at a slant forwardly and downwardly to the vertical whereby fruit can be conveniently inserted from the front of the machine, a discharge spout extending from a point in the casing below the low point of said slanting opening, and cover means for the spout and said top casing opening, said cover means for said top casing opening being a hinged lid secured to the high point of the inclined opening and opening rearwardly and upwardly, and the cover means for the spout being adapted to be opened for discharge of juice from the casing, both cover means being adapted to remain closed during idle periods of the machine to fully protect it from contamination from without, the opened cover for the top casing opening preventing chance contact of the juice with a customer at the rear of the machine.

JACK W. PUTERBAUGH.